US007826562B2

(12) United States Patent
Nio et al.

(10) Patent No.: US 7,826,562 B2
(45) Date of Patent: Nov. 2, 2010

(54) DIGITAL INTERFACE RECEIVER APPARATUS

(75) Inventors: Yutaka Nio, Osaka (JP); Kouichiro Nagata, Ibaraki (JP); Koichi Tanaka, Kawanishi (JP)

(73) Assignee: Panasonic Corporation, Osaka (JP)

( * ) Notice: Subject to any disclaimer, the term of this patent is extended or adjusted under 35 U.S.C. 154(b) by 1373 days.

(21) Appl. No.: 10/548,065

(22) PCT Filed: May 27, 2004

(86) PCT No.: PCT/JP2004/007659

§ 371 (c)(1),
(2), (4) Date: Sep. 6, 2005

(87) PCT Pub. No.: WO2004/107750

PCT Pub. Date: Dec. 9, 2004

(65) Prior Publication Data

US 2006/0095623 A1    May 4, 2006

(30) Foreign Application Priority Data

May 28, 2003  (JP)  ............................. 2003-150637

(51) Int. Cl.
*H04L 27/00*   (2006.01)

(52) U.S. Cl. .................. 375/316; 348/553; 348/632; 348/738; 375/347; 386/46; 386/96; 386/124

(58) Field of Classification Search ................. 345/520; 710/260

See application file for complete search history.

(56) References Cited

U.S. PATENT DOCUMENTS 4,618,890 A   10/1986   Kouyama et al.

| 4,891,824 A | * | 1/1990 | Takamura et al. ........... 375/351 |
| 5,144,441 A | | 9/1992 | Sparks et al. |
| 5,276,714 A | | 1/1994 | Hori et al. |

(Continued)

FOREIGN PATENT DOCUMENTS

CN    1116390    2/1996

(Continued)

OTHER PUBLICATIONS

English language Abstract of JP 2-285724.

(Continued)

*Primary Examiner*—Shuwang Liu
*Assistant Examiner*—Dhaval Patel
(74) *Attorney, Agent, or Firm*—Greenblum & Bernstein, P.L.C.

(57) ABSTRACT

An audio controlling device generates an audio mute signal based on the level of a power-supply voltage supplied from the source equipment, whether a clock signal has been input or not, whether a digital signal has been input or not, whether a multiplier circuit is being locked or not, an error rate, whether an audio clock detection circuit is being locked or not, the presence or absence of a change in a control signal, and whether a synchronization detection circuit is stable or not. The audio controlling device applies the audio mute signal to an audio mute circuit, while applying an OSD control signal to an OSD processing circuit. The audio mute circuit is placed in a mute state or unmute state based on the audio mute signal. The OSD processing circuit provides the on-screen display of a message based on the OSD control signal.

9 Claims, 6 Drawing Sheets

U.S. PATENT DOCUMENTS

| | | | | |
|---|---|---|---|---|
| 5,363,384 | A | * | 11/1994 | Miyoshi et al. ............. 714/747 |
| 5,467,139 | A | | 11/1995 | Lankford |
| 5,809,407 | A | * | 9/1998 | Kasperkovitz et al. ... 455/184.1 |
| 6,583,821 | B1 | * | 6/2003 | Durand ....................... 348/515 |
| 6,671,503 | B1 | * | 12/2003 | Niwamoto ................. 455/212 |
| 6,771,316 | B1 | * | 8/2004 | Iggulden .................... 348/553 |
| 2003/0035486 | A1 | | 2/2003 | Kato et al. |
| 2003/0090590 | A1 | | 5/2003 | Yoshizawa et al. |
| 2005/0099994 | A1 | * | 5/2005 | Kato et al. ................. 370/352 |

FOREIGN PATENT DOCUMENTS

| | | |
|---|---|---|
| JP | 57-194637 | 11/1982 |
| JP | 2-285724 | 11/1990 |
| JP | 7-264500 | 10/1995 |
| JP | 8-307789 | 11/1996 |
| JP | 2003-153124 | 5/2003 |

OTHER PUBLICATIONS

DDWG, "Digital Visual Interface DVI," Revision 1.0, Apr. 2, 1999, retrieved from <URL: http://www.ddwg.org/>.

U.S. Appl. No. 10/548,066 to Gotanda et al.

English language Abstract of JP 2003-153124.

English language Abstract of JP 57-194637.

English language Abstract of JP 8-307789.

English language Abstract of JP 7-264500.

* cited by examiner

DIGITAL INTERFACE RECEIVER APPARATUS

TECHNICAL FIELD

The present invention relates to a digital interface receiver in accordance with a transmission standard that provides for transmission of a digital signal containing an audio signal.

BACKGROUND ART

In recent years, the development of a variety of electronic equipment in accordance with high-speed digital interface standards, such as the HDMI (High Definition Multimedia Interface) standard or DVI (Digital Visual Interface) standard, is in progress. The HDMI standard, in particular, defines the transmission of an audio signal and a control signal during the video blanking interval. These high-speed digital interface standards adopt the so-called TMDS (Transmission Minimized Differential Signaling) serial transmission system.

FIG. 6 is a diagram that shows an example of a conventional DVI-compliant signal transmission system (DDWG, "Digital Visual Interface," Revision 1.0, Apr. 2, 1999).

The signal transmission system of FIG. 6 includes TMDS encoder/serializers 2601, 2602, 2603 on the transmission side and TMDS decoder/recoveries 2604, 2605, 2606 on the reception side.

On the transmission side, an 8-bit red component signal R, a data enable signal DE, and 2-bit control signals CTL2, CTL3 are input to the TMDS encoder/serializer 2601. Also, an 8-bit green component signal G, a data enable signal DE, and 2-bit control signals CTL0, CTL1 are input to the TMDS encoder/serialzer 2602. Furthermore, an 8-bit blue component signal B, a data enable signal DE, and 2-bit synchronization signals HSYNC, VSYNC are input to the TMDS encoder/serializer 2603.

The TMDS encoder/serializer 2601 encodes the 8-bit red component signal R according to TMDS to convert it into a 10-bit, serial signal. The purpose of the 8- to 10-bit conversion is to transform the signal into a format suitable for high-speed transmission by decreasing the change points of data.

The TMDS encoder/serializer 2601 also encodes the 2-bit control signals CTL2, CTL3 to convert them into a 10-bit, serial signal. It further encodes the data enable signal DE to convert it into a serial signal.

In this manner, the TMDS encoder/serializer 2601 sends the serial signal containing the time-division multiplexed red component signal R, data enable signal DE, and control signals CTL2, CTL3 out to the transmission line of a channel ch2.

Similarly, the TMDS encoder/serializer 2602 sends the serial signal containing the time-division multiplexed green component signal G, data enable signal DE, and control signals CTL0, CTL1 out to a channel ch1 as a transmission line. The TMDS encoder/serializer 2603 also sends the serial signal containing the time-division multiplexed blue component signal B, data enable signal DE, and synchronization signals HSYC, VSYNC out to the transmission line of a channel ch0.

On the reception side, the TMDS decoder/recovery 2604 decodes the serial signal sent via the transmission line of the channel ch2 according to TMDS to recover the 8-bit red component signal R, data enable signal DE, and 2-bit control signals CTL2, CTL3. The TMDS decoder-recovery 2605 decodes the serial signal sent via the transmission line of the channel ch1 according to TMDS to recover the 8-bit green component signal G, data enable signal DE, and 2-bit control signals CTL0, CTL1. The TMDS decoder/recovery 2606 decodes the serial signal sent via the transmission line of the channel ch0 according to TMDS to recover the 8-bit blue component signal B, data enable signal DE, and 2-bit synchronization signals HSYNC, VSYNC.

The data enable signals DE, respectively, indicate the periods of time in which the red component signal R, green component signal G, and blue component signal B are present, each attaining a high level or "H" level in its active state.

As an example, the period in which the data enable signal DE attains low level or "L" level corresponds to the period of a horizontal synchronization signal or the period of a vertical synchronization signal for video. Note also that the above-mentioned four control signals CTL0, CTL1, CTL2, CTL3 stand ready, although the current DV1 standard leaves the control signals CTL0, CTL1, CTL2, CTL3 unused. More specifically, the control signals CTL0, CTL1, CTL2, CTL3 remain at zero all the time.

The HDMI standard, on the other hand, provides the transmission of a digital audio signal in addition to a digital video signal defined by the DV1 standard. The transmission of the digital audio signal may generate audio noise due to cable disconnection or plugging in, transmission error, power-supply ON/OFF, or switching of video/audio formats, which gives a user a disagreeable feeling or damages the speaker.

DISCLOSURE OF INVENTION

It is an object of the present invention to provide a digital interface receiver in which audio noise disagreeable to a user is decreased.

A digital interface receiver according to one aspect of the present invention for receiving a digital signal containing an audio signal transmitted from a source comprises a reception unit that receives the digital signal transmitted from the source, a detection device that detects an interface state between the digital interface receiver and the source, a mute circuit that mutes the audio signal extracted from the digital signal, and a controlling device that controls the mute circuit to be in a mute state or unmute state based on a detection result from the detection device.

In the digital interface receiver, the reception unit receives the digital signal containing the audio signal that is transmitted from the source. Then, the detection device detects the interface state between the digital interface receiver and the source. Based on the detection result from the detection device, the controlling device controls the mute circuit to be in the mute state or unmute state.

In this case, the mute circuit mutes the audio signal based on the interface state. This eliminates audio noise which may give a disagreeable feeling to the user.

The controlling device may place the mute circuit in a mute state when the interface state detected by the detection device is in a given defective state, and it may place the mute circuit in an unmute state when a given period of time has elapsed since the interface state detected by the detection device turned into a given normal state.

In this case, the mute circuit is placed in the mute state when the interface state is in the given defective state, and placed in the unmute state when the given period of time has elapsed since the interface state turned into the given normal state. Audio noise is thus reliably eliminated.

The detection device may include a voltage detection circuit that detects the level of a power-supply voltage supplied from the source, and the controlling device may place the mute circuit in a mute state when the level of the power-supply voltage detected by the voltage detection circuit is equal to or less than a given threshold value.

In this case, the mute circuit is placed in the mute state when the level of the power-supply voltage from the source is equal to or less than the given threshold value. This eliminates audio noise which is caused when the source is being turned off or the cable is poorly connected, for example.

The reception unit may further receive a clock signal that is transmitted from the source, the detection device including a clock detection circuit that detects as the interface state whether the clock signal has been input or not from the source, and the controlling device placing the mute circuit in a mute state when the clock detection circuit does not detect a clock signal input.

In this case, the mute circuit is placed in the mute state when the clock signal input to be transmitted from the source is not detected. This eliminates audio noise which is caused when the source is being turned off, the cable is poorly connected, the signal has not been input, or there is a defect in a transmission system, for example.

The reception unit may further receive a clock signal that is transmitted from the source, the digital interface receiver further comprising a multiplier circuit that multiplies the clock signal received by the reception unit, the detection device including a lock detection circuit that detects whether the multiplier circuit is being locked or not as the interface state, and the controlling device placing the mute circuit in a mute state when the lock detection circuit detects that the multiplier circuit is being unlocked.

In this case, the mute circuit is placed in the mute state when it is detected that the multiplier circuit is being unlocked. This eliminates audio noise which is caused when the source is being turned off, the format of the digital signal has changed, the cable is poorly connected, the signal has not been input, or there is a defect in the transmission system, for example.

The detection device may include a digital signal detection circuit that detects whether the digital signal to be transmitted from the source has been input or not, and the controlling device placing the mute circuit in a mute state when the digital signal detection circuit does not detect a digital signal input.

In this case, the mute circuit is placed in the mute state when the digital signal input is not detected. This eliminates audio noise which is caused when the source is being turned off, the cable is poorly connected, the signal has not been input, or there is a defect in the transmission system, for example.

The detection device may include an operating state detection circuit that detects an operating state of the source as the interface state, and the controlling device may place the mute circuit in a mute state when the operating state detection circuit detects that the source is not operating.

In this case, the mute circuit is placed in the mute state when it is detected that the source is not operating. This eliminates audio noise which is caused when the source is being turned off or the signal has not been input, for example.

The operating state detection circuit may include a level detection circuit that detects an operating state of the source based on the level of the digital signal transmitted from the source, and the controlling device may place the mute circuit in a mute state when the level of the digital signal detected by the level detection circuit is equal to or less than a given value.

In this case, the mute circuit is placed in the mute state when the level of the digital signal is equal to or less than the given value. This eliminates audio noise which is caused when the source is being turned off or the signal has not been input, for example.

The detection device may include an error detection circuit that detects as the interface state an error rate of the digital signal received by the reception unit, and the controlling device may place the mute circuit in a mute state when the error rate detected by the error detection circuit exceeds a given value.

In this case, the mute circuit is placed in the mute state when the error rate exceeds the given value. This eliminates audio noise which is caused when the source is being turned off, the cable is poorly connected, or there is a defect in the transmission system, for example.

The digital signal received by the reception unit may include a control signal, the digital interface receiver further comprising an audio clock generation circuit that generates an audio clock signal based on the control signal, the detection device including a lock detection circuit that detects whether the audio clock generation circuit is being locked or not as the interface state, and the controlling device placing the mute circuit in a mute state when the lock detection circuit detects that the audio clock generation circuit is being unlocked.

In this case, the mute circuit is placed in the mute state when it is detected that the audio clock generation circuit is being unlocked. This eliminates audio noise which is caused when the source is being turned off, the format of the digital signal has changed, the cable is poorly connected, the signal has not been input, or there is a defect in the transmission system, for example.

The digital signal received by the reception unit may include a control signal, the detection device including a change detection circuit that detects a change of the format of the digital signal based on the control signal, and the controlling device placing the mute circuit in a mute state when the change detection circuit detects the change of the format.

In this case, the mute circuit is placed in the mute state when such a change is detected in the format of the digital signal. This eliminates audio noise which is caused when the format of the digital signal has changed.

The digital signal received by the reception unit may include a video signal and a synchronization signal, the detection device including a format detection circuit that detects the format of the video signal based on the synchronization signal as the interface state, and the controlling device placing the mute circuit in a mute state when the format detection circuit detects a change of the format of the video signal.

In this case, the mute circuit is placed in the mute state when such a change is detected in the format of the video signal. This eliminates audio noise which is caused when the format of the digital signal has changed.

The digital signal received by the reception unit may include a synchronization signal, the digital interface receiver further comprising a sync separation circuit that separates the synchronization signal from the digital signal received by the reception unit, the detection device including a synchronization detection circuit that detects whether the synchronization signal separated by the sync separation circuit is stable or not as the interface state, and the controlling device placing the mute circuit in a mute state when the synchronization detection circuit detects that the synchronization signal is in an unstable state.

In this case, the mute circuit is placed in the mute state when the synchronization signal separated from the digital signal is in an unstable state. This eliminates audio noise which is caused when the source is being turned off, the format of the digital signal has changed, the cable is poorly connected, the signal has not been input, or there is a defect in the transmission system, for example.

The detection device may include a plurality of state detection circuits that respectively detect a plurality of states as the interface state, and the controlling device may place the mute circuit in a mute state when at least one of the plurality of states detected by the plurality of state detection circuits is in a given defective state.

The mute circuit is placed in the mute state when at least one of the plurality of states which are detected by the plurality of state detection circuits is in the given defective state. This eliminates audio noise in the event of any of various defects.

The digital signal received by the reception unit may include a video signal and a control signal, the digital interface receiver further comprising an on-screen display processing circuit that synthesizes the video signal received by the reception unit and a signal for on-screen display, and the controlling device controlling the on-screen display processing circuit to provide the on-screen display of a message based on a detection result from the detection device.

In this case, the message based on the detection result from the detection device is displayed on a screen. This allows the user to easily recognize that the interface state is in a defective state.

The reception unit may further receive a clock signal that is transmitted from the source, and when the level of a power-supply voltage supplied from the source is equal to or less than a given threshold value, and the clock signal and digital signal inputs are not detected, the controlling device may control the on-screen display processing circuit to provide the on-screen display of a message indicating that the signals are yet to be input.

In this case, the message indicating that the signals are yet to be input is displayed on the screen. This allows the user to easily recognize that the signals are yet to be input.

The reception unit may further receive a clock signal that is transmitted from the source, and the controlling device may control the on-screen display processing circuit to provide the on-screen display of a message indicating that an error has occurred in authenticating a copyright-protecting technique, when a synchronization signal extracted from the digital signal is in a stable state and also a video clock signal generated based on the clock signal is in a stable state; and when the error rate of the digital signal exceeds a given value, or an audio clock signal generated based on the control signal is in an unstable state, or the control signal varies within a certain period of time.

In this case, the message indicating that an error has occurred in authenticating the copyright-protection technique is displayed on the screen. This allows the user to easily recognize that the error has occurred in authenticating the copyright-protecting technique.

The reception unit may further receive a clock signal that is transmitted the source, and the controlling device may control the on-screen display processing circuit to provide the on-screen display of a message indicating that an error of a transmission system has occurred, when a synchronization signal extracted from the digital signal is in an unstable state, and also a video clock signal generated based on the clock signal is in an unstable state; and when the error rate of the digital signal exceeds a given value, or an audio clock signal generated based on the control signal is in an unstable state, or the control signal varies within a certain period of time.

In this case, the message indicating that an error has occurred in the transmission system is displayed on the screen. This allows the user to easily recognize that the error of the transmission system has occurred.

BEST MODE FOR CARRYING OUT THE INVENTION

Figure 1:
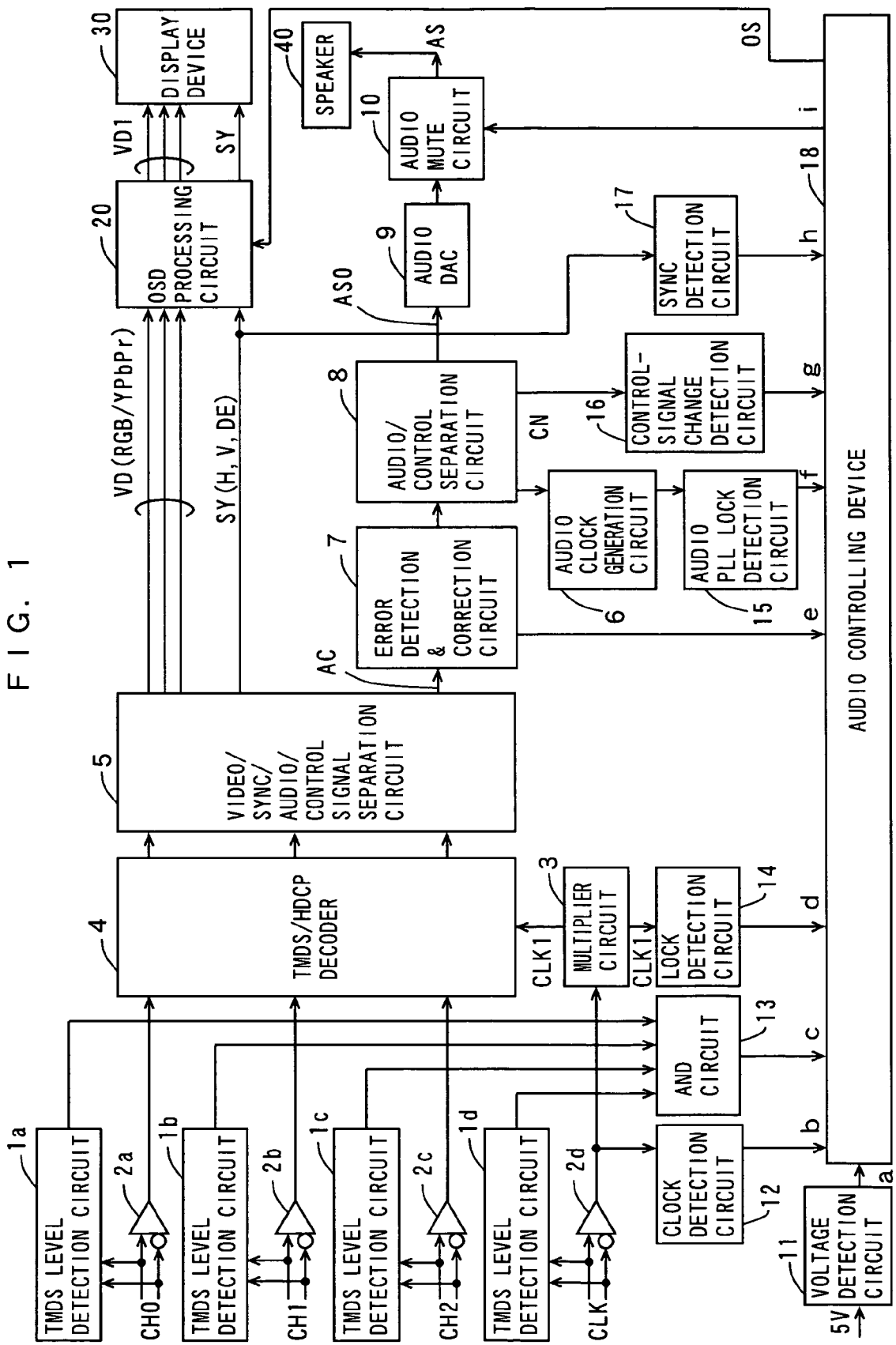
FIG. 1 is a block diagram showing the structure of a high-speed digital video/audio interface receiver according to one embodiment of the present invention.

FIG. 1 is a block diagram that shows the structure of a high-speed digital video/audio interface receiver according to one embodiment of the invention.

In FIG. 1, the high-speed digital video/audio interface receiver (which will be referred to as the digital interface receiver) comprises: a plurality of TMDS level detection circuits $1a$, $1b$, $1c$, $1d$; a plurality of differential buffers $2a$, $2b$, $2c$, $2d$; a multiplier circuit 3; a TMDS/HDCP (Hi-Bandwidth Digital Content Protection) decoder 4; a video/sync/audio/control signal separation circuit (which will be referred to as a separation circuit) 5; an audio clock generation circuit 6; an error detection/correction circuit 7; an audio/control separation circuit (which will be referred to as a separation circuit) 8; an audio DAC (Digital-to-Analog Converter) 9; and an audio mute circuit 10. This digital interface receiver comprises: a voltage detection circuit 11; a clock detection circuit 12; an AND circuit 13; a lock detection circuit 14; an audio PLL (Phase-locked loop) lock detection circuit 15; a control-signal change detection circuit 16; a synchronization detection circuit 17; an audio controlling device 18; and an OSD (On Screen Display) processing circuit 20.

The OSD processing circuit 20 is connected with a display device 30 including a CRT (Cathode Ray Tube), liquid crystal display, plasma display, or the like. The audio mute circuit 10 is connected with a speaker 40.

The digital interface receiver is mounted in a video display such as a television receiver.

Digital signals in accordance with a high-speed digital interface standard such as the HMDI standard or DVI standard are sent to the digital interface receiver from source equipment.

The source equipment includes, e.g. a DVD (Digital Versatile Disk) reproducing device, STB (Set Top Box), or personal computer.

The source equipment has output buffers in accordance with the LVDS (Low Voltage Differential Signaling) standard, TMDS standard, or the like. In the embodiment, the source equipment has the TMDS-compliant output buffers.

In the embodiment, the digital interface receiver is connected to the source equipment through an HDMI-compliant interface cable. With the HDMS standard, it is possible to transmit video signals while transmitting supplemental data during blanking intervals (vertical blanking and horizontal blanking intervals) of the video signals. The supplemental data contains audio signals and data packets called Info Frame (Information Frame).

The TMDS level detection circuits 1a, 1b, 1c, 1d, respectively, are provided with TMDS-format data (digital signals) CH0, CH1, CH2, and clock signal CLK which are transmitted from the source equipment through the cable. The differential buffers 2a, 2b, 2c, 2d are also provided with the data CH0, CH1, CH2, and clock signal CLK, respectively. Each of the data CH0, CH1, CH2 contains multiplexed video signal, synchronization signal, audio signal, and control signal.

The TMDS level detection circuits 1a, 1b, 1d, 1d determine whether or not the levels of the data CH0, CH1, CH2, and clock signal CLK, respectively, are equal to or more than a given value, and then output signals indicating the determinations to the AND circuit 13. The signals output from the TMDS level detection circuits 1a, 1b, 1c, 1d, respectively, attain a high or "H" level when each of the data CH0, CH1, CH2, and clock signal CLK is equal to or more than a given value. When any of the data CH0, CH1, CH2, and clock signal CLK is lower than a given value, they attain a low or "L" level.

The differential buffers 2a, 2b, 2c apply the data CH0, CH1, CH2 to the decoder 4. The differential buffer 2d applies the clock signal CLK to the multiplier circuit 3 and the clock detection circuit 14.

The multiplier circuit 3 generates a high-speed clock signal CLK1 for TMDS-decoding based on the clock signal CLK, and applies it to the decoder 4 and lock detection circuit 14.

The decoder 4 decodes the TMDS-format data CH0, CH1, CH2 using the high-speed clock signal CLK1, and also decodes HDCP as digital content protection.

The separation circuit 5 separates the data decoded by the decoder 4 into a video signal VD, video synchronization signal SY, and audio/control signal AC. The video signal VD is composed of a red component signal R, green component signal G, and blue component signal B. Alternatively, the video signal VD may be composed of a luminance signal Y and color difference signals Pb, Pr. The video synchronization signal SY is composed of a horizontal synchronization signal H, vertical synchronization signal V, and data enable signal DE.

Based on an OSD control signal OS described below that is output from the audio controlling device 18, the OSD processing circuit 20 synthesizes the video signal VD and a graphic signal for on-screen display, and outputs the synthesized video signal VD1, while outputting the video synchronization signal SY.

The error detection/correction circuit 7 detects and corrects an error in the audio/control signal AC output from the separation circuit 5, and outputs the corrected audio/control signal AC to the separation circuit 8. The error detection/correction circuit 7 also outputs a signal e indicating the result of a detected error rate to the audio controlling device 18. The output signal e attains H level when the error rate is equal to or less than a given value. When the error rate exceeds a given value, the output signal e attains L level.

The separation circuit 8 separates the audio/control signal AC output from the error detection/detection circuit 7 into a digital audio signal AS0 and a control signal CN. The control signal CN is transmitted from the source equipment during video blanking intervals.

The audio clock generation circuit 6 generates an audio clock signal, using information that indicates frequency division ratio/multiplication ratio. The frequency division/multiplication ratios information is transmitted during the video blanking intervals from the source equipment as portion of the control signal for creating the audio clock signal based on the video clock signal.

The audio DAC 9 converts the digital audio signal AS0 output from the separation circuit 8 into an analog audio signal AS. The audio mute circuit 10 mutes the analog audio signal AS output from the audio DAC 9, based on an audio mute signal i described below output from the audio controlling device 18.

The voltage detection circuit 11 detects a power-supply voltage of 5 V that is supplied from the source equipment, and applies a signal a indicating the result to the audio controlling device 18. The output signal a attains H level when the level of the power-supply voltage exceeds a given threshold value, and attains L level when it is equal to or less than the threshold value.

The clock detection circuit 12 determines whether or not the clock signal CLK to be transmitted from the source equipment has been received, and applies the determination as a signal b to the audio controlling device 18. The output signal b attains H level when the clock signal CLK has been received, and attains L level when not.

The AND circuit 13 operates a logical product of the signals output from the TMDS level detection circuits 1a, 1b, 1c, 1d, and applies a signal c indicating the operation result to the audio controlling device 18. The output signal c attains H level when all of the data CH0, CH1, CH2, and clock signal CLK exceed a given value, or otherwise attains L level.

The lock detection circuit 14 determines whether the multiplier circuit 3 is being locked or not, and applies a signal d indicating the determination to the audio controlling device 18. The output signal d attains H level when the multiplier circuit 3 is being locked, and attains L level when it is being unlocked.

The audio PLL lock detection circuit 15 determines whether the audio clock generation circuit 6 is being locked or not, and applies a signal f indicating the determination to the audio controlling device 18. The output signal f attains H level when the audio clock generation circuit 6 is being locked, and attains L level when it is being unlocked.

The control-signal change detection circuit 16 detects a change in the control signal CN output from the separation circuit 8, and applies a signal g indicating the detected change in the control signal CN to the audio controlling device 18. The output signal g attains H level when no change is detected in the control signal CN, and attains L level when such a change is detected in the control signal CN.

The synchronization detection circuit 17 determines whether or not the video synchronization signal SY is output in a stable manner, and applies a signal f indicating the determination to the audio controlling device 18. The output signal f attains H level when the video synchronization signal SY is output in a stable manner, and attains L level when the video synchronization signal SY is in an unstable state.

Based on the signal a output from the voltage detection circuit 11, signal b from the clock detection circuit 12, signal c from the AND circuit 13, signal d from the lock detection circuit 14, signal e from the error detection/correction circuit 7, signal f from the audio PLL lock detection circuit 15, signal g from the control-signal change detection circuit 16, and signal h from the synchronization detection circuit 17, the audio controlling device 18 generates the audio mute signal i, and applies it to the audio mute circuit 10 while applying the OSK control signal OS to the OSD processing circuit 20.

In this case, when any of the signals a to h attains L level, the audio controlling device 18 controls the audio mute signal i to be in a mute state (L level state). This causes the audio mute circuit 10 to be in a mute state. When, on the other hand, all of the signals a to h being at H level, the audio controlling device 18 places the audio mute signal i in an unmute state (H level state). This releases the audio mute circuit 10 from its mute state.

The audio controlling device 18 may be composed of a processor such as a microcomputer, or a re-configurable logic where the circuit configuration can be reassembled, or a dedicated circuit, or a combination of two or three of the above.

Figure 2:
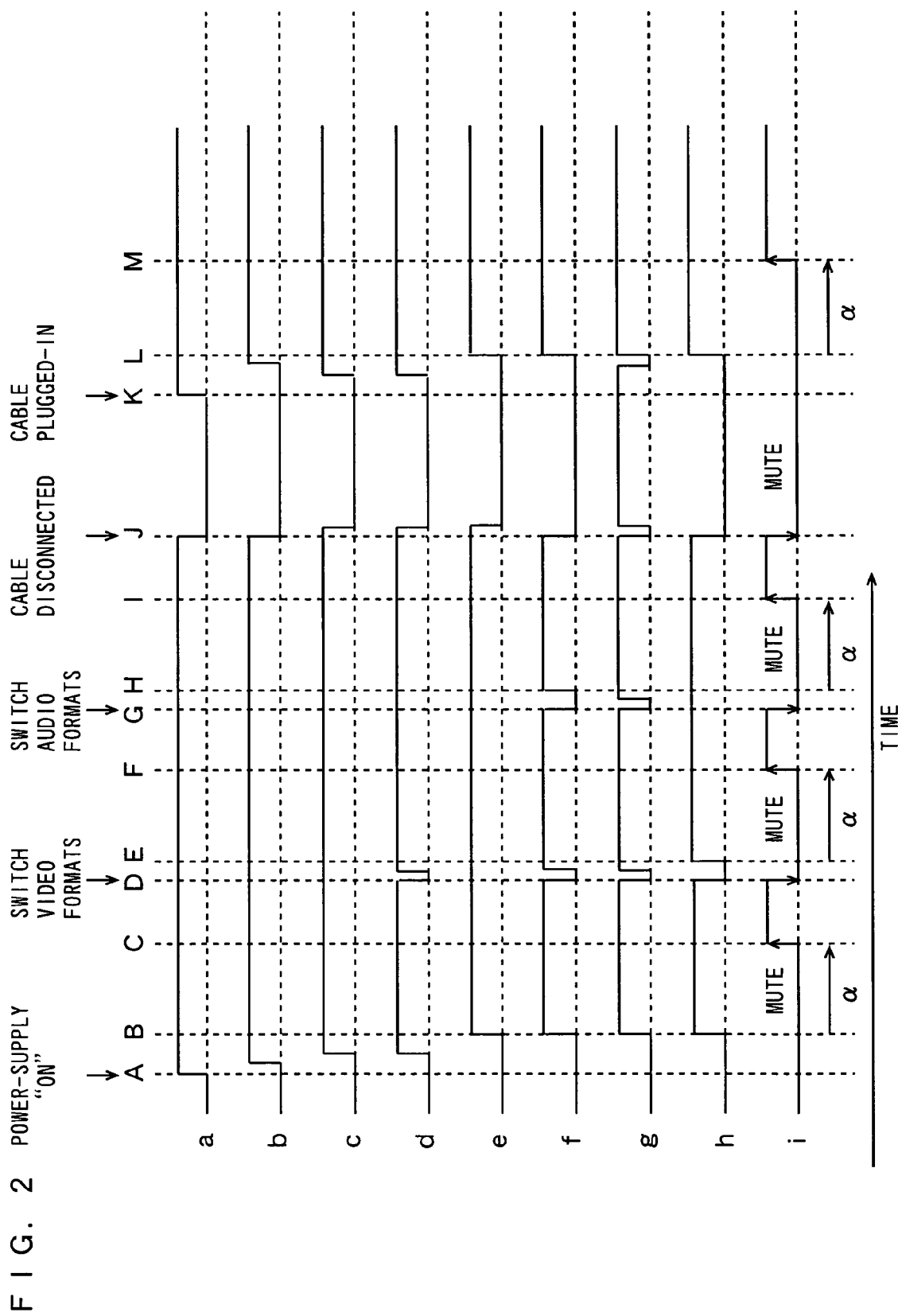
FIG. 2 is a diagram showing an example of the operation of the digital interface receiver of FIG. 1.

FIG. 2 is a diagram that shows an example of the operation of the digital interface receiver of FIG. 1.

In FIG. 2, when the power-supply is being turned off, the audio mute signal i output from the audio controlling device 18 is controlled to be in a mute state (L level state) In this manner, the audio mute circuit 10 is in a mute state.

At timing A, the digital interface receiver is turned on, which causes the signal a from the voltage detection circuit 11 to be in H level if the video signal and audio signal outputs from the source equipment are stable. Then, the signal b from the clock detection circuit 12, signal c from the AND circuit 13, and signal d from the lock detection circuit 14 achieve H level, followed by the signal e from the error detection/correction circuit 7, signal f from the audio PLL lock detection circuit 15, signal g from the control-signal change detection circuit 16, and signal h from the synchronization detection circuit 17 at timing B.

After a certain period of time a has elapsed since all of the output signals a to h have achieved H level, the audio mute signal i output from the audio controlling device 18 attains H level. This releases the audio mute circuit 10 from its mute state at timing C. The certain period of time a, during which mute control is reliably performed, may be any length of time that is not affected by the delay of the audio signal.

In this state, the video format of the video signal is switched at timing D, which causes the signal d output from the lock detection circuit 14, signal f from the audio PLL lock detection circuit 15, signal g from the control-signal change detection circuit 16, and signal h from the synchronization detection circuit 17 to attain L level.

With any of the output signals a to h being at L level, the audio controlling device 18 causes the audio mute signal i to attain L level. This places the audio mute circuit 10 in a mute state. Upon completion of switching of the video formats, the output signals d, f, g, h return to H level. Then at timing E, all of the output signals a to h attain H level.

After a certain period of time α has elapsed since all of the output signals a to h have attained H level, the audio mute signal i output from the audio controlling device 18 attains H level. This releases the audio mute circuit 10 from its mute state at timing F.

Then, the video format of the audio signal is switched, and the signal f output from the audio PLL lock detection circuit 15 and signal g from the control-signal change detection circuit 16 attain L level at timing G.

With any of the output signals a to h being at L level, the audio controlling device 18 causes the audio mute signal i to attain L level. This places the audio mute circuit 10 in a mute state. Upon completion of switching of the video formats, the output signals f and g return to H level. This causes all of the output signals a to h to attain H level at timing H.

After a certain period of time α has elapsed since all of the output signals a to h have attained H level, the audio mute signal i output from the audio controlling device 18 attains H level. This releases the audio mute circuit 10 from its mute state at timing I.

Next, when the cable is disconnected at timing J, the output signals a, b, c, d, e, f, g, h attain L level. When any of the output signals a to h is at L level, the audio controlling device 18 places the audio mute signal i in an L level state. This causes the audio mute circuit 10 to be in a mute state. In this case, only the output signal g among the output signals a to i returns to H level after a certain period of time has elapsed, while the other signals, a, b, c, d, e, f, h remain at L level until the cable is plugged in. As a result, the audio mute circuit 10 keeps its mute state.

When the cable is plugged in at timing K, the output signals a, b, c, d, e, f, h return to H level. This causes all of the output signals a to h to attain H level at timing L. After a certain period of time a has elapsed since all of the output signals a to h have attained H level, the audio mute signal i output from the audio controlling device 18 attains H level. This releases the audio mute circuit 10 from its mute state.

Figure 3:
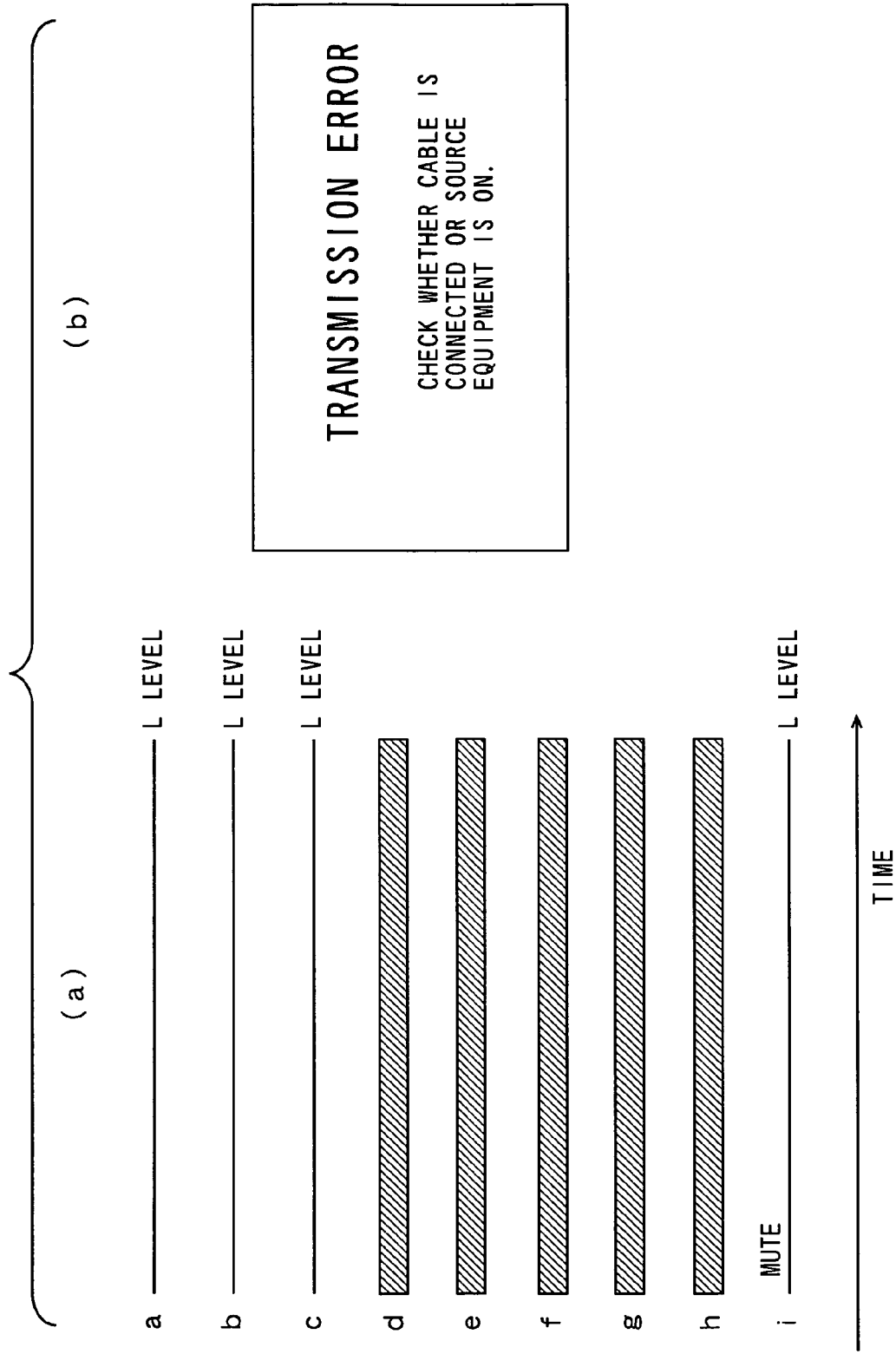
FIG. 3(a) is a diagram showing signal states in the digital interface receiver in the event of an error.
FIG. 3(b) is a diagram showing a first example of an on-screen display.

FIG. 3 is a diagram that shows a first example of signal states and on-screen display in the digital interface receiver in the event of an error.

The example of FIG. 3(*a*) shows the states of the output signals a to h and audio mute signal i when a transmission error has occurred because the cable is not connected or the source equipment is turned off. In this case, the data CH0, CH1, CH2, and clock signal CLK are yet to be input.

When the output signals a, b, c remain stable at L level for more than a given period of time, the audio controlling device 18 of FIG. 1 determines that at least one of the data CH0, CH1, CH2, and clock signal CLK is yet to be input, and controls the OSK processing circuit 20 with the OSK control signal LS to provide the on-screen display as shown in FIG. 3(*b*) on the screen of the display device 30.

The example of FIG. 3(*b*) provides on the display of the display device 30 a message reading that the transmission error has occurred, and a message telling to check if the cable is connected or the source equipment is ON.

Figure 4:
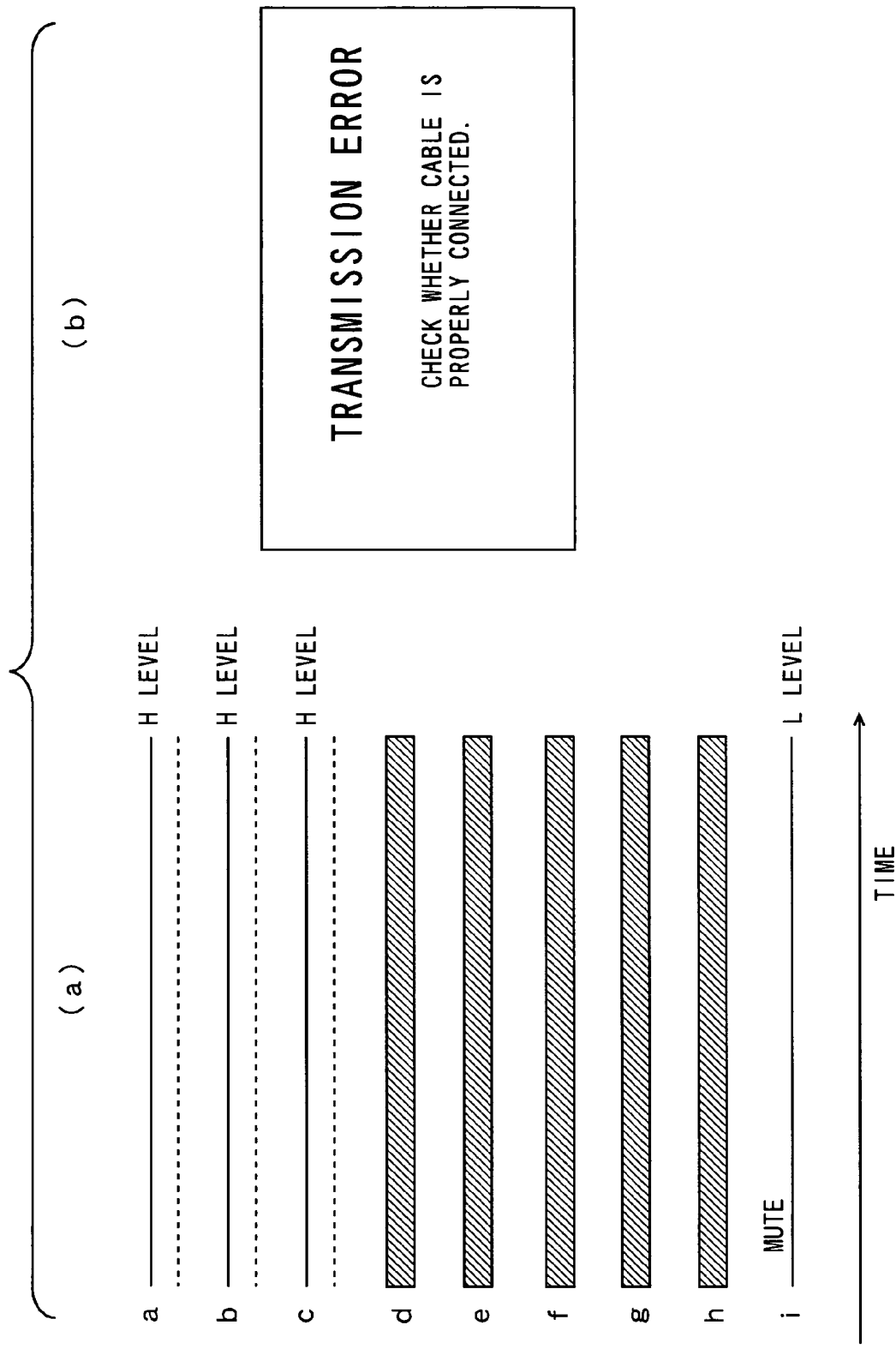
FIG. 4(a) is a diagram showing signal states in the digital interface receiver in the event of an error.
FIG. 4(b) is a diagram showing a second example of an on-screen display.

FIG. 4 is a diagram that shows a second example of signal states and on-screen display in the digital interface receiver in the event of an error.

The example of FIG. 4(*a*) shows the states of the output signals a to h and audio mute signal i in the event of a transmission error due to a poor connection of the cable.

When the output signals a, b, c remain at H level for more than a given period of time, while the output signals d, e, f, g, h repeatedly vary between L level and H level for a certain period of time or remain in an L level state, the audio controlling device 18 of FIG. 1 determines that a transmission error has occurred, and controls the OSD processing circuit 20 with the OSD control signal OS to provide the on-screen display as shown in FIG. 4(*b*) on the display of the display device 30.

The example of FIG. 4(*b*) provides on the display of the display device 30, a message reading that the transmission error has occurred and a message telling to check if the cable is properly connected.

Figure 5:
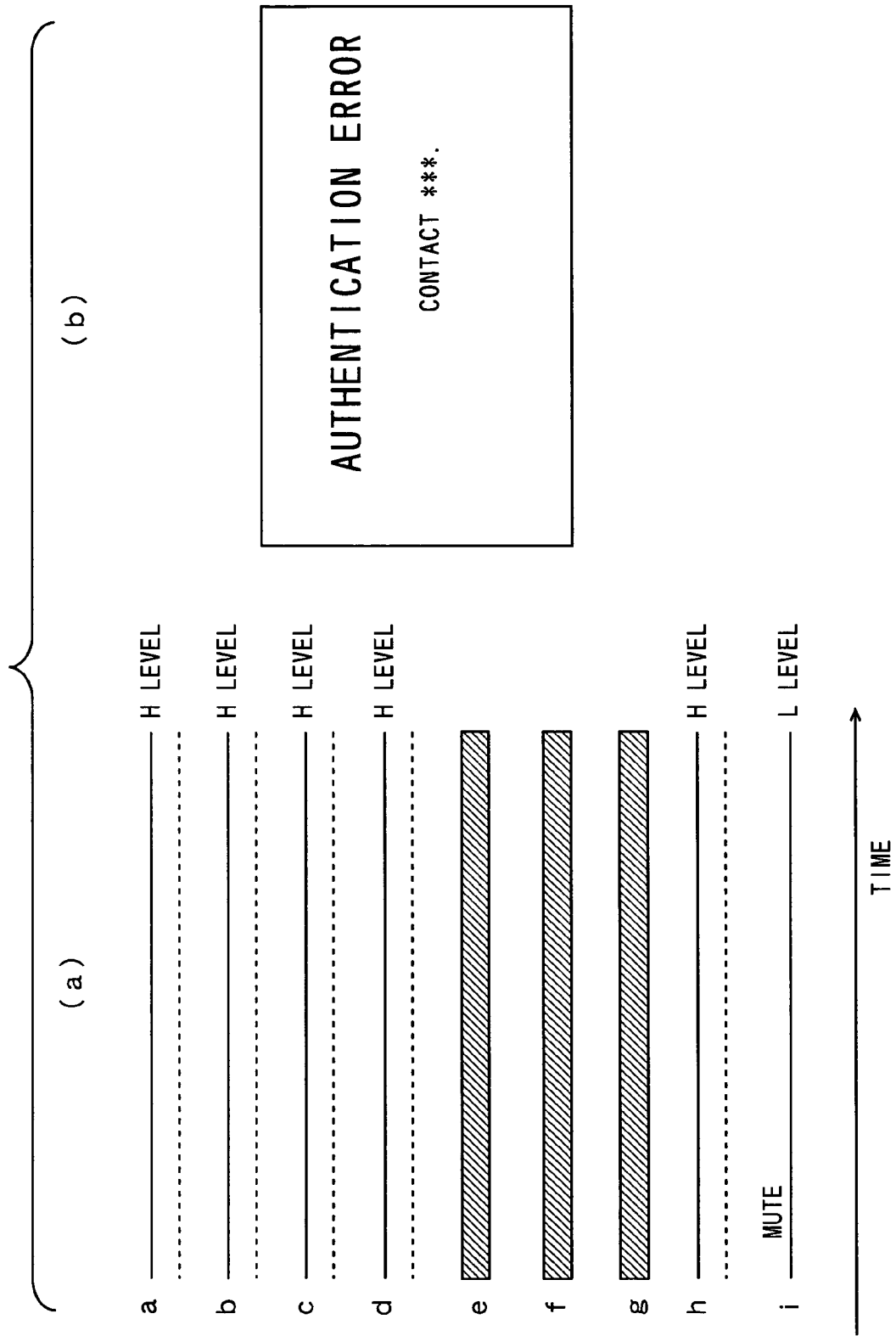
FIG. 5(a) is a diagram showing signal states in the digital interface receiver in the event of an error.
FIG. 5(b) is a diagram showing a third example of an on-screen display.
Figure 6:
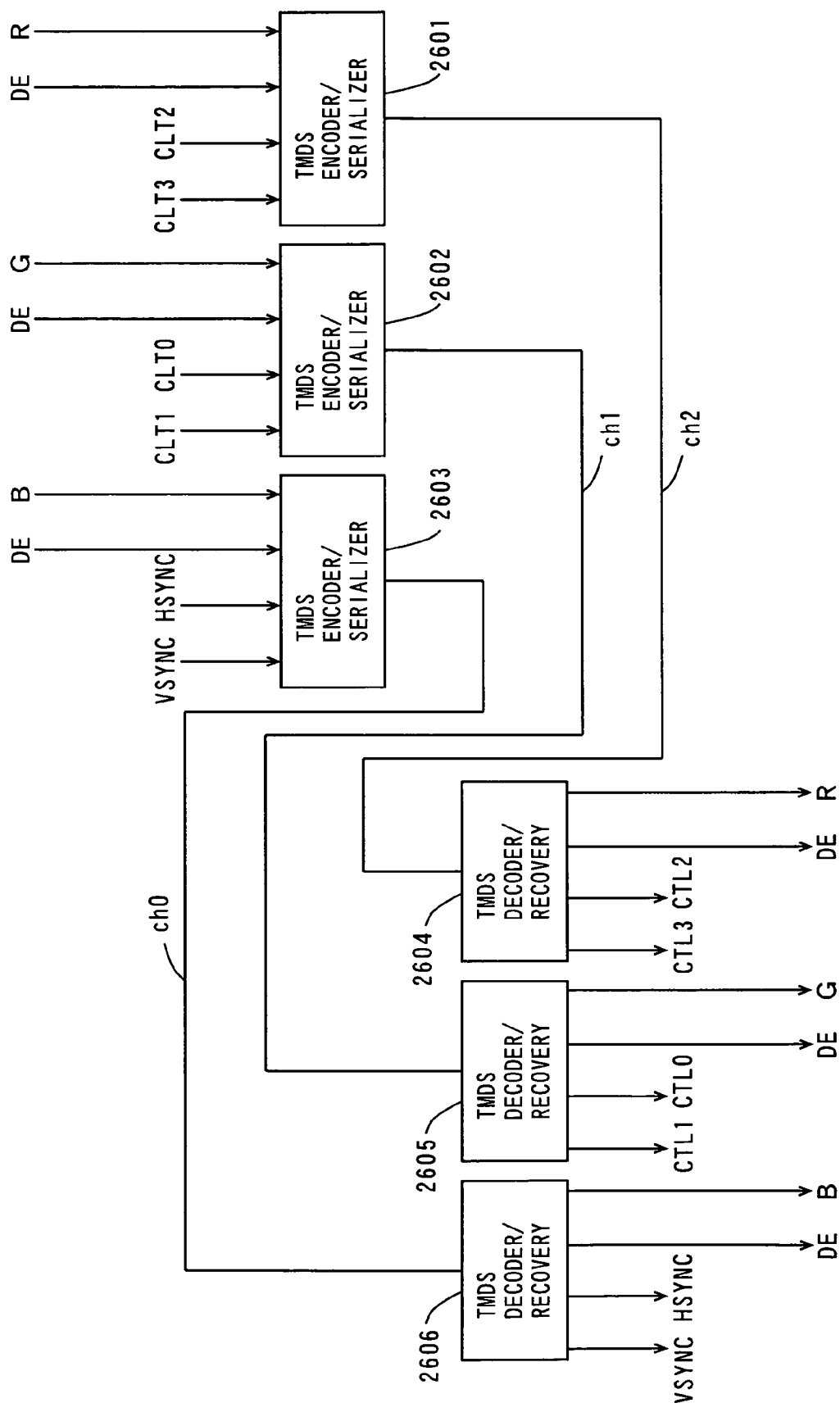
FIG. 6 is a diagram showing the structure of a conventional DVI-compliant signal transmission system.

FIG. 5 is a diagram that shows a third example of signal states and on-screen display in the digital interface receiver in the event of an error.

The example of FIG. 5(*a*) shows the states of the output signals a to h and audio mute signal i in the event of an error in authenticating HDCP.

When the output signals a, b, c, d, h remain stable at H level for more than a given period of time, while the output signals d, e, f, g repeatedly vary between L level and H level for a certain period of time or remain in an L level state, the audio controlling device 18 of FIG. 1 determines that an authentication error for the copyright-protecting HDCP has occurred, and controls the OSD processing circuit 20 with the OSD control signal OS to provide the on-screen display as shown in FIG. 5(*b*) on the display of the display device 30.

The example of FIG. 5(*b*) provides on the display of the display device 30, a message reading that the authentication error has occurred and a message telling to contact a person in charge.

In the digital interface receiver according to the embodiment, audio noise can be reduced that is attributed to various changes of the signal states in the digital signals in accordance with the high-speed digital interface standard for transmitting a video signal, audio signal, and control signal. This prevents giving the user a disagreeable feeling due to the audio noise, while avoiding damage to audio output devices such as the speaker 40.

Also, the user is allowed to recognize the cause of the generation of audio noise with the display of an error condition provided on the screen.

In this embodiment, the differential buffers 2*a* to 2*d* correspond to a reception unit; the TMDS level detection circuits 1*a* to 1*d*, error detection/correction circuit 7, voltage detection circuit 11, clock detection circuit 12, AND circuit 13, lock detection circuit 14, audio PLL lock detection circuit 15, control-signal change detection circuit 16, and synchronization detection circuit 17 correspond to a detection device or a plurality of state detection circuits. The audio mute circuit 10 corresponds to a mute circuit, and the audio controlling device 18 to a controlling device.

The voltage detection circuit 11 corresponds to a voltage detection circuit; the clock detection circuit 12 to a clock detection circuit; the multiplier circuit 3 to a multiplier circuit; the lock detection circuit 14 to a lock detection circuit; the TMDS level detection circuits 1*a* to 1*d* and the AND circuit 13 correspond to a digital signal detection circuit, operating state detection circuit, or level detection circuit; the error detection/correction circuit 7 corresponds to an error detection circuit; the audio clock generation circuit 6 corresponds to an audio clock generation circuit; the audio PLL lock detection circuit 15 to a lock detection circuit; the control-signal change detection circuit 16 to a change detection circuit or a format detection circuit; the separation circuit 5 to a synchronization signal separation circuit; the synchronization detection circuit 17 to a synchronization detection circuit; and the OSD processing circuit 20 to an on-screen display processing circuit.

While in this embodiment, the digital interface receiver is configured to receive the digital signals in accordance with the HDMI standard, it may alternatively be configured to receive digital signals in accordance with another high-speed digital interface standard such as the DVI standard from source equipment.

The invention claimed is:

1. A digital interface receiver for receiving a digital signal containing a digital audio signal a video signal, a synchronization signal and a control signal transmitted from a source, comprising:
    a first reception unit that receives said digital signal transmitted from said source;
    a second reception unit that receives a clock signal that is transmitted from said source to demodulate said digital signal;
    a demodulation unit that demodulates said digital signal received by said first reception unit by using the clock signal received by said second reception unit;
    a detection device that detects an interface state between said digital interface receiver and said source;
    a mute circuit that mutes the demodulated digital audio signal which is extracted from said digital signal; and
    a controlling device that controls said mute circuit to be in a mute state or unmute state based on a detection result from said detection device, wherein
    said detection device includes a clock detection circuit that detects as said interface state whether the clock signal has been input or not from said source, and
    said controlling device places said mute circuit in a mute state when said clock detection circuit does not detect a clock signal input.

2. A digital interface receiver for receiving a digital signal containing a digital audio signal, a video signal, a synchronization signal and a control signal transmitted from a source, comprising:
    a first reception unit that receives said digital signal transmitted from said source;
    a second reception unit that receives a clock signal that is transmitted from said source to demodulate said digital signal;
    a demodulation unit that demodulates said digital signal received by said first reception unit by using the clock signal received by said second reception unit;
    a detection device that detects an interface state between said digital interface receiver and said source;
    a mute circuit that mutes the demodulated digital audio signal, which is extracted from said digital signal; and
    a controlling device that controls said mute circuit to be in a mute state or unmute state based on a detection result from said detection device, wherein
    said digital interface receiver further comprises a multiplier circuit that multiplies the clock signal received by said reception unit,
    said detection device includes a lock detection circuit that detects whether said multiplier circuit is being locked or not as said interface state, and
    said controlling device places said mute circuit in a mute state when said lock detection circuit detects that said multiplier circuit is being unlocked.

3. A digital interface receiver for receiving a digital signal containing a digital audio signal, a video signal, a synchronization signal and a control signal transmitted from a source, comprising:
    a first reception unit that receives said digital signal transmitted from said source;
    a second reception unit that receives a clock signal that is transmitted from said source to demodulate said digital signal;
    a demodulation unit that demodulates said digital signal received by said first reception unit by using the clock signal received by said second reception unit;
    a detection device that detects an interface state between said digital interface receiver and said source;
    a mute circuit that mutes the demodulated digital audio signal which is extracted from said digital signal; and
    a controlling device that controls said mute circuit to be in a mute state or unmute state based on a detection result from said detection device, wherein
    said detection device includes a digital signal detection circuit that detects whether the digital signal to be transmitted from said source has been input or not, and
    said controlling device places said mute circuit in a mute state when said digital signal detection circuit does not detect a digital signal input.

4. A digital interface receiver for receiving a digital signal containing a digital audio signal, a video signal, a synchronization signal and a control signal transmitted from a source, comprising:
- a first reception unit that receives said digital signal transmitted from said source;
- a second reception unit that receives a clock signal that is transmitted from said source to demodulate said digital signal;
- a demodulation unit that demodulates said digital signal received by said first reception unit by using the clock signal received by said second reception unit;
- a detection device that detects an interface state between said digital interface receiver and said source;
- a mute circuit that mutes the demodulated digital audio signal which is extracted from said digital signal; and
- a controlling device that controls said mute circuit to be in a mute state or unmute state based on a detection result from said detection device, wherein
- said detection device includes an operating state detection circuit that detects an operating state of said source as said interface state,
- said controlling device places said mute circuit in a mute state when said operating state detection circuit detects that said source is not operating,
- said operating state detection circuit includes a level detection circuit that detects an operating state of said source based on the level of the digital signal transmitted from said source, and
- said controlling device places said mute circuit in a mute state when the level of the digital signal detected by said level detection circuit is equal to or less than a given value.

5. A digital interface receiver for receiving a digital signal containing a digital audio signal, a video signal, a synchronization signal and a control signal transmitted from a source, comprising:
- a first reception unit that receives said digital signal transmitted from said source;
- a second reception unit that receives a clock signal that is transmitted from said source to demodulate said digital signal;
- a demodulation unit that demodulates said digital signal received by said first reception unit by using the clock signal received by said second reception unit;
- a detection device that detects an interface state between said digital interface receiver and said source;
- a mute circuit that mutes the demodulated digital audio signal which is extracted from said digital signal; and
- a controlling device that controls said mute circuit to be in a mute state or unmute state based on a detection result from said detection device, wherein
- said detection device includes an error detection circuit that detects as said interface state an error rate of the digital signal received by said reception unit, and
- said controlling device places said mute circuit in a mute state when the error rate detected by said error detection circuit exceeds a given value.

6. A digital interface receiver for receiving a digital signal containing a digital audio signal, a video signal, a synchronization signal and a control signal transmitted from a source, comprising:
- a first reception unit that receives said digital signal transmitted from said source;
- a second reception unit that receives a clock signal that is transmitted from said source to demodulate said digital signal;
- a demodulation unit that demodulates said digital signal received by said first reception unit by using the clock signal received by said second reception unit;
- a detection device that detects an interface state between said digital interface receiver and said source;
- a mute circuit that mutes the demodulated digital audio signal which is extracted from said digital signal; and
- a controlling device that controls said mute circuit to be in a mute state or unmute state based on a detection result from said detection device, wherein
- said digital interface receiver further comprises an audio clock generation circuit that generates an audio clock signal based on said control signal,
- said detection device includes a lock detection circuit that detects whether said audio clock generation circuit is being locked or not as said interface state, and
- said controlling device places said mute circuit in a mute state when said lock detection circuit detects that said audio clock generation circuit is being unlocked.

7. A digital interface receiver for receiving a digital signal containing a digital audio signal, a video signal, a synchronization signal and a control signal transmitted from a source, comprising:
- a first reception unit that receives said digital signal transmitted from said source;
- a second reception unit that receives a clock signal that is transmitted from said source to demodulate said digital signal;
- a demodulation unit that demodulates said digital signal received by said first reception unit by using the clock signal received by said second reception unit;
- a detection device that detects an interface state between said digital interface receiver and said source;
- a mute circuit that mutes the demodulated digital audio signal which is extracted from said digital signal; and
- a controlling device that controls said mute circuit to be in a mute state or unmute state based on a detection result from said detection device, wherein
- said detection device includes a change detection circuit that detects a change of the format of said digital signal based on said control signal, and
- said controlling device places said mute circuit in a mute state when said change detection circuit detects said change of the format.

8. A digital interface receiver for receiving a digital signal containing a digital audio signal, a video signal, a synchronization signal and a control signal transmitted from a source, comprising:
- a first reception unit that receives said digital signal transmitted from said source;
- a second reception unit that receives a clock signal that is transmitted from said source to demodulate said digital signal;
- a demodulation unit that demodulates said digital signal received by said first reception unit by using the clock signal received by said second reception unit;
- a detection device that detects an interface state between said digital interface receiver and said source;
- a mute circuit that mutes the demodulated digital audio signal which is extracted from said digital signal; and
- a controlling device that controls said mute circuit to be in a mute state or unmute state based on a detection result from said detection device, wherein
- said detection device includes a format detection circuit that detects the format of said video signal based on said synchronization signal as said interface state, and said controlling device places said mute circuit in a mute state when said format detection circuit detects a change of the format of said video signal.

9. A digital interface receiver for receiving a digital signal containing a digital audio signal, a video signal, a synchronization signal and a control signal transmitted from a source, comprising:
   a first reception unit that receives said digital signal transmitted from said source;
   a second reception unit that receives a clock signal that is transmitted from said source to demodulate said digital signal;
   a demodulation unit that demodulates said digital signal received by said first reception unit by using the clock signal received by said second reception unit;
   a detection device that detects an interface state between said digital interface receiver and said source;
   a mute circuit that mutes the demodulated digital audio signal which is extracted from said digital signal; and
   a controlling device that controls said mute circuit to be in a mute state or unmute state based on a detection result from said detection device, wherein
said digital interface receiver further comprises a sync separation circuit that separates the synchronization signal from the demodulated digital signal,
said detection device includes a synchronization detection circuit that detects whether the synchronization signal separated by said sync separation circuit is stable or not as said interface state, and
said controlling device places said mute circuit in a mute state when said synchronization detection circuit detects that the synchronization signal is in an unstable state.

\* \* \* \* \*

UNITED STATES PATENT AND TRADEMARK OFFICE
CERTIFICATE OF CORRECTION

| | | |
|---|---|---|
| PATENT NO. | : 7,826,562 B2 | |
| APPLICATION NO. | : 10/548065 | |
| DATED | : November 2, 2010 | |
| INVENTOR(S) | : Yutaka Nio et al. | |

It is certified that error appears in the above-identified patent and that said Letters Patent is hereby corrected as shown below:

At Column 11, Line 57 (Claim 1, Line 2) of the printed patent insert --,-- after digital audio signal.

At Column 12, Line 3 (Claim 1, Line 15) of the printed patent delete "demodulated" before digital.

At Column 12, Line 4 (Claim 1, Line 16) of the printed patent insert --,-- after digital audio signal.

At Column 12, Line 4 (Claim 1, Line 16) of the printed patent insert --demodulated-- before digital.

At Column 12, Line 28 (Claim 2, Line 15) of the printed patent delete "demodulated" before digital.

At Column 12, Line 29 (Claim 2, Line 16) of the printed patent insert --demodulated-- before digital.

At Column 12, Line 57 (Claim 3, Line 15) of the printed patent delete "demodulated" before digital.

At Column 12, Line 58 (Claim 3, Line 16) of the printed patent insert --,-- after signal.

At Column 12, Line 58 (Claim 3, Line 16) of the printed patent insert --demodulated-- before digital signal.

At Column 12, Line 63 (Claim 3, Line 21) of the printed patent delete "to be transmitted from said source".

Signed and Sealed this
Twenty-first Day of June, 2011

David J. Kappos
*Director of the United States Patent and Trademark Office*

CERTIFICATE OF CORRECTION (continued)
U.S. Pat. No. 7,826,562 B2

At Column 13, Line 15 (Claim 4, Line 15) of the printed patent delete "demodulated" before digital.

At Column 13, Line 16 (Claim 4, Line 16) of the printed patent insert --,-- after signal.

At Column 13, Line 16 (Claim 4, Line 16) of the printed patent insert --demodulated-- before digital signal.

At Column 13, Line 48 (Claim 5, Line 15) of the printed patent delete "demodulated" before digital.

At Column 13, Line 49 (Claim 5, Line 16) of the printed patent insert --,-- after signal.

At Column 13, Line 49 (Claim 5, Line 16) of the printed patent insert --demodulated-- before digital.

At Column 13, Line 54 (Claim 5, Line 21) of the printed patent insert --demodulated-- before digital.

At Column 13, Line 55 (Claim 5, Line 22) of the printed patent delete "received by said reception unit".

At Column 14, Line 6 (Claim 6, Line 15) of the printed patent delete "demodulated" before digital.

At Column 14, Line 7 (Claim 6, Line 16) of the printed patent insert --,-- after signal.

At Column 14, Line 7 (Claim 6, Line 16) of the printed patent insert --demodulated-- before digital.

At Column 14, Line 34 (Claim 7, Line 15) of the printed patent delete "demodulated" before digital.

At Column 14, Line 35 (Claim 7, Line 16) of the printed patent insert --,-- after signal.

At Column 14, Line 35 (Claim 7, Line 16) of the printed patent insert --demodulated-- before digital.

At Column 14, Line 60 (Claim 8, Line 15) of the printed patent delete "demodulated" before digital.

CERTIFICATE OF CORRECTION (continued)
U.S. Pat. No. 7,826,562 B2

At Column 14, Line 61 (Claim 8, Line 16) of the printed patent insert --,-- after signal.

At Column 14, Line 61 (Claim 8, Line 16) of the printed patent insert --demodulated-- before digital.

At Column 16, Line 1 (Claim 9, Line 15) of the printed patent delete "demodulated" before digital.

At Column 16, Line 2 (Claim 9, Line 16) of the printed patent insert --,-- after signal.

At Column 16, Line 2 (Claim 9, Line 16) of the printed patent insert --demodulated-- before digital.

In accordance with the above, the correct claims read as follows:

1. A digital interface receiver for receiving a digital signal containing a digital audio signal, a video signal, a synchronization signal and a control signal transmitted from a source, comprising:
a first reception unit that receives said digital signal transmitted from said source;
a second reception unit that receives a clock signal that is transmitted from said source to demodulate said digital signal;
a demodulation unit that demodulates said digital signal received by said first reception unit by using the clock signal received by said second reception unit;
a detection device that detects an interface state between said digital interface receiver and said source;
a mute circuit that mutes the digital audio signal, which is extracted from said demodulated digital signal; and
a controlling device that controls said mute circuit to be in a mute state or unmute state based on a detection result from said detection device, wherein
said detection device includes a clock detection circuit that detects as said interface state whether the clock signal has been input or not from said source, and
said controlling device places said mute circuit in a mute state when said clock detection circuit does not detect a clock signal input.

2. A digital interface receiver for receiving a digital signal containing a digital audio signal, a video signal, a synchronization signal and a control signal transmitted from a source, comprising:
a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said digital interface receiver further comprises a multiplier circuit that multiplies the clock signal received by said reception unit, said detection device includes a lock detection circuit that detects whether said multiplier circuit is being locked or not as said interface state, and said controlling device places said mute circuit in a mute state when said lock detection circuit detects that said multiplier circuit is being unlocked.

3. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said detection device includes a digital signal detection circuit that detects whether the digital signal has been input or not, and said controlling device places said mute circuit in a mute state when said digital signal detection circuit does not detect a digital signal input.

4. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said detection device includes an operating state detection circuit that detects an operating state of said source as said interface state, said controlling device places said mute circuit in a mute state when said operating state detection circuit detects that said source is not operating, said operating state detection circuit includes a level detection circuit that detects an operating state of said source based on the level of the digital signal transmitted from said source, and said controlling device places said mute circuit in a mute state when the level of the digital signal detected by said level detection circuit is equal to or less than a given value.

5. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said detection device includes an error detection circuit that detects as said interface state an error rate of the demodulated digital signal, and said controlling device places said mute circuit in a mute state when the error rate detected by said error detection circuit exceeds a given value.

6. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said digital interface receiver further comprises an audio clock generation circuit that generates an audio clock signal based on said control signal, said detection device includes a lock detection circuit that detects whether said audio clock generation circuit is being locked or not as said interface state, and said controlling device places said mute circuit in a mute state when said lock detection circuit detects that said audio clock generation circuit is being unlocked.

7. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said detection device includes a change detection circuit that detects a change of the format of said digital signal based on said control signal, and said controlling device places said mute circuit in a mute state when said change detection circuit detects said change of the format.

8. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said detection device includes a format detection circuit that detects the format of said video signal based on said synchronization signal as said interface state, and said controlling device places said mute circuit in a mute state when said format detection circuit detects a change of the format of said video signal.

9. A digital interface receiver for receiving a digital signal containing a digital audio signal, a video signal, a synchronization signal and a control signal transmitted from a source, comprising:

a first reception unit that receives said digital signal transmitted from said source;

a second reception unit that receives a clock signal that is transmitted from said source to demodulate said digital signal;

a demodulation unit that demodulates said digital signal received by said first reception unit by using the clock signal received by said second reception unit;

a detection device that detects an interface state between said digital interface receiver and said source;

a mute circuit that mutes the digital audio signal, which is extracted from said demodulated digital signal; and a controlling device that controls said mute circuit to be in a mute state or unmute state based on a detection result from said detection device, wherein said digital interface receiver further comprises a sync separation circuit that separates the synchronization signal from the demodulated digital signal, said detection device includes a synchronization detection circuit that detects whether the synchronization signal separated by said sync separation circuit is stable or not as said interface state, and said controlling device places said mute circuit in a mute state when said synchronization detection circuit detects that the synchronization signal is in an unstable state.